US011227065B2

(12) United States Patent
Granet et al.

(10) Patent No.: US 11,227,065 B2
(45) Date of Patent: Jan. 18, 2022

(54) STATIC DATA MASKING

(71) Applicant: Microsoft Technology Licensing, LLC, Redmond, WA (US)

(72) Inventors: Estienne G. Granet, Seattle, WA (US); William B. Dubishar, Seattle, WA (US); Jill M. McClenahan, Kirkland, WA (US); Oren Yossef, Bellevue, WA (US); Jeffrey D. Welton, Maple Valley, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 168 days.

(21) Appl. No.: 16/181,803

(22) Filed: Nov. 6, 2018

(65) Prior Publication Data
US 2020/0143082 A1 May 7, 2020

(51) Int. Cl.
*G06F 21/62* (2013.01)
*G06F 16/22* (2019.01)
(Continued)

(52) U.S. Cl.
CPC ........ *G06F 21/6254* (2013.01); *G06F 16/221* (2019.01); *G06F 16/2282* (2019.01);
(Continued)

(58) Field of Classification Search
CPC .. G06F 21/62; G06F 21/6254; G06F 21/6227; G06F 16/2282; G06F 16/22; G06F 16/221; G06F 16/24; G06F 16/24553; G06F 16/00; G06F 12/00; G06F 12/14; G06F 12/0871; G06F 21/6218; G06F 21/32; H04L 9/003; H04L 9/0618; H04L 2209/046
(Continued)

(56) References Cited

U.S. PATENT DOCUMENTS 4,858,147 A 8/1989 Conwell
7,089,356 B1 8/2006 Chen et al.
(Continued)

FOREIGN PATENT DOCUMENTS

EP 1410260 B1 * 11/2007 ............. G06F 12/00
KR 101522870 B1 * 5/2015 ............. G06F 12/14

OTHER PUBLICATIONS

Cloning in snowflakes by Snowflakes pp. 7; May 19, 2017.*
(Continued)

*Primary Examiner* — Samson B Lemma
*Assistant Examiner* — Ali H. Cheema
(74) *Attorney, Agent, or Firm* — Holzer Patel Drennan

(57) ABSTRACT

The static data masking system may perform one or more operations including unbinding tables in a database, evaluating masking operations on the tables to determine that at least one masking operation on a particular column of a candidate table is a complex masking operation that cannot be completed using a query, adding a temporary key column with unique values to the candidate table, generating a temporary table including the temporary key column and an empty masked column, generating masked values for the particular column at a client, and populating the masked values for the particular column in the empty masked column of the temporary table.

18 Claims, 5 Drawing Sheets

(51) Int. Cl.
*G06F 16/2455* (2019.01)
*H04L 9/00* (2006.01)

(52) U.S. Cl.
CPC ........ *G06F 16/24553* (2019.01); *H04L 9/003* (2013.01); *H04L 2209/046* (2013.01)

(58) Field of Classification Search
USPC .......... 726/28, 1, 27, 26; 711/119; 707/737, 707/757, 803; 380/28
See application file for complete search history.

(56) References Cited

U.S. PATENT DOCUMENTS

| | | | |
|---|---|---|---|
| 7,162,741 | B2 | 1/2007 | Eskin et al. |
| 7,328,201 | B2 | 2/2008 | D'Ambrosio |
| 7,424,464 | B2 | 9/2008 | Oliver et al. |
| 7,533,107 | B2 | 5/2009 | Gupta et al. |
| 7,680,335 | B2 | 3/2010 | Okada et al. |
| 7,720,830 | B2 | 5/2010 | Wen et al. |
| 7,756,873 | B2 | 7/2010 | Gould et al. |
| 7,870,084 | B2 | 1/2011 | D'Ambrosio |
| 7,882,121 | B2 | 2/2011 | Bruno et al. |
| 8,000,538 | B2 | 8/2011 | Sarkar |
| 9,465,954 | B1* | 10/2016 | Speedie ............. G06F 21/6227 |
| 10,628,604 | B1* | 4/2020 | Thackston .......... G06F 12/0871 711/119 |
| 2002/0048350 | A1 | 4/2002 | Phillips et al. |
| 2002/0090631 | A1 | 7/2002 | Gough et al. |
| 2002/0095405 | A1* | 7/2002 | Fujiwara ............. G06F 21/6227 |
| 2004/0186819 | A1 | 9/2004 | Baker |
| 2004/0205474 | A1 | 10/2004 | Eskin et al. |
| 2004/0267773 | A1 | 12/2004 | Levine et al. |
| 2005/0053999 | A1 | 3/2005 | Gough et al. |
| 2005/0114369 | A1 | 5/2005 | Gould et al. |
| 2005/0144176 | A1* | 6/2005 | Lei ...................... G06F 21/6227 |
| 2005/0259814 | A1* | 11/2005 | Gebotys ................ H04L 9/0618 380/28 |
| 2006/0123009 | A1 | 6/2006 | Bruno et al. |
| 2007/0185851 | A1 | 8/2007 | Bruno et al. |
| 2007/0188355 | A1* | 8/2007 | Baek ....................... H04L 9/003 341/51 |
| 2008/0065665 | A1 | 3/2008 | Pomroy et al. |
| 2008/0086444 | A1 | 4/2008 | Yu et al. |
| 2008/0133934 | A1* | 6/2008 | Gopinath ............. G06F 11/3672 713/189 |
| 2008/0138799 | A1 | 6/2008 | Cheng et al. |
| 2008/0253557 | A1* | 10/2008 | Dottax .................. H04L 9/0631 380/28 |
| 2009/0204631 | A1* | 8/2009 | Pomroy ............... G06F 21/6227 |
| 2009/0271361 | A1* | 10/2009 | Pattabhi ................ G06F 16/217 |
| 2010/0138223 | A1 | 6/2010 | Koshinaka |
| 2010/0145902 | A1 | 6/2010 | Boyan et al. |
| 2010/0205189 | A1* | 8/2010 | Ebrahimi ............ G06F 21/6227 707/757 |
| 2010/0306156 | A1 | 12/2010 | De Kleer |
| 2010/0318481 | A1 | 12/2010 | Feynman |
| 2011/0093469 | A1 | 4/2011 | B'far et al. |
| 2011/0270837 | A1* | 11/2011 | Raj ...................... G06F 21/6227 707/737 |
| 2012/0143813 | A1 | 6/2012 | B'far et al. |
| 2012/0197919 | A1* | 8/2012 | Chen ...................... G06F 16/00 707/757 |
| 2012/0246696 | A1* | 9/2012 | Boukobza ........... G06F 21/6254 726/1 |
| 2012/0278290 | A1* | 11/2012 | Pinch ................... G06F 11/0751 707/691 |
| 2012/0323828 | A1 | 12/2012 | Sontag et al. |
| 2012/0330880 | A1 | 12/2012 | Arasu et al. |
| 2013/0060820 | A1* | 3/2013 | Bulusu ............. G06F 16/24564 707/803 |
| 2013/0159353 | A1* | 6/2013 | Fuh ..................... G06F 21/6254 707/803 |
| 2014/0123303 | A1 | 5/2014 | Shukla et al. |
| 2015/0067886 | A1* | 3/2015 | Maman ............... G06F 21/6218 726/27 |
| 2015/0082449 | A1* | 3/2015 | Mushkatblat ....... G06F 21/6254 726/26 |
| 2015/0113656 | A1 | 4/2015 | D'costa et al. |
| 2016/0127123 | A1* | 5/2016 | Johnson ................ H04L 9/0631 713/189 |
| 2016/0350343 | A1* | 12/2016 | Xia ...................... G06F 16/2282 |
| 2018/0285589 | A1* | 10/2018 | Jayaraman ............. G06F 21/32 |
| 2019/0155930 | A1* | 5/2019 | Fender ................ G06F 16/2282 |
| 2019/0377895 | A1* | 12/2019 | Sanghi ................ G06F 21/6227 |
| 2020/0026792 | A1* | 1/2020 | Mallya ................ G06F 21/6254 |

OTHER PUBLICATIONS

Use Dynamic Data Masking to Obfuscate your Sensitive Data by Ronit Reger (Microsoft SQL Server Blog) pp. 7; Jan. 7, 2016.*
Static Versus Dynamic Data Masking by Steve Pomroy pp. 10; Jul. 10, 2017.*
Data Masking Techniques for NoSQL Database Security: A Systematic Review by Alfredo Cuzzocrea and Hossain Shahriar pp. 7; IEEE (Year: 2017).*
Data Masking Algorithms Strength by Scott W. Ambler pp. 22; (Year: 2005).*
"IBM DB2 test data generator", Retrieved From: https://www.ibm.com/developerworks/data/library/techarticle/dm-0706salkosuo/index.html, Jun. 7, 2007, 16 Pages.
"Non Final Office Action Issued In U.S. Appl. No. 13/166,831", dated Apr. 26, 2013, 16 Pages.
"Notice of Allowance Issued In U.S. Appl. No. 13/166,831", dated Nov. 20, 2013, 19 Pages.
Abbeel, P, et al., "Learning factor graphs in polynomial time and sample complexity", In Journal of Machine Learning Research, 2006, 46 Pages.
Aboulnaga, A, et al., "Generating synthetic complex-structured XML data", In WebDB, May 2001, 6 Pages.
Aiello, W, "A random graph model for power law graphs", In Journal of Experimental Mathematics, vol. 10, Issue 1, 2001, 25 Pages.
Arasu, Arvind, et al., "Data Generation using Declarative Constraints", In Proceedings of the 2011 ACM SIGMOD International Conference on Management of data, Jun. 12, 2011, pp. 685-696.
Barbosa, D, et al., "ToXgene: An extensible template-based data generator for XML", In WebDB, 2002, 6 Pages.
Bayardo, et al., "Fast Algorithms for Finding Extremal Sets", In Journal of Experimental Algorithmics (JEA), vol. 21, 2016, 10 Pages.
Binnig, C, et al., "QAGen: generating query-aware test databases", In Proceedings of the 2007 ACM SIGMOD international conference on Management of data, Jun. 11, 2007, pp. 341-352.
Binnig, C, "Reverse query processing", In Proceedings of IEEE 23rd International Conference on Data Engineering, Apr. 15, 2007, 48 Pages.
Bruno, N, et al., "Flexible database generators", In Proceedings of Very Large Data Bases Endowment, Jan. 2005, 11 Pages.
Bruno, N, et al., "Generating queries with cardinality constraints for dbms testing", In Proceedings of IEEE Transactions on Knowledge and Data Engineering, vol. 18, Issue: 12, Oct. 30, 2006, pp. 1721-1725.
Bruno, et al., "Stholes: A multidimensional workload-aware histogram", In Proceedings of the ACM SIGMOD international conference on Management of data, May 21, 2001, pp. 211-222.
Castellanos, M, "Data desensitization of customer data for use in optimizer performance experiments", In Proceedings of IEEE 26th International Conference on Data Engineering, Mar. 1, 2010, pp. 1081-1092.
Chaudhuri, et al., "An Overview of Data Warehousing and OLAP Technology", In Journal of ACM SIGMOD Record, vol. 26, Issue 1, Mar. 1997, 10 Pages.
Cohen, S, "Generating XML structure using examples and constraints", In Proceedings of the VLDB Endowment, vol. 1, Issue 1, Aug. 2008, pp. 490-501.

(56) References Cited

OTHER PUBLICATIONS

Cullot, et al., "Ontologies: A Contribution to the DL/DB debate", In Proceedings of the 1st International Workshop on the Semantic Web and Databases, Sep. 7, 2003, 21 Pages.

Ding, et al., "Application-Specific Schema Design for Storing Large RDF Datasets", Retrieved From: http://www.hpl.hp.com/techreports/2003/HPL-2003-170.html, Dec. 16, 2003, 15 Pages.

Dwork, Cynthia, "Differential Privacy", In Proceedings of the 33rd International Colloquium on Automata, Languages and Programming, Part II, Jul. 2006, 12 Pages.

Getoor, L, et al., "Selectivity estimation using probabilistic models", In Proceedings of the 2001 ACM SIGMOD international conference on Management of data, May 21, 2001, pp. 461-472.

Gray, J, et al., "Quickly Generating Billion-record Synthetic Databases", In Proceedings of the 1994 ACM SIGMOD international conference on Management of data, vol. 23, Issue 2, May 24, 1994, pp. 243-252.

Gupta, et al., "Efficient Inference with Cardinality-based Clique Potentials", In Proceedings of the 24th international conference on Machine learning, Jun. 20, 2007, pp. 329-336.

Hammersley, J M., et al., "Markov fields on ?finite graphs and lattices", In Unpublished manuscript, 1971.

Houkjaer, K, "Wind. Simple and realistic data generation", In Proceedings of the 32nd international conference on Very large data bases, Sep. 12, 2006, pp. 1243-1246.

Jha, et al., "Query Evaluation with Soft-Key Constraints", In Proceedings of the twenty-seventh ACM SIGMOD-SIGACT-SIGART symposium on Principles of database systems, Jun. 9, 2008, pp. 119-128.

Korte, B, et al., "Combinatorial Optimization: Theory and Algorithms", In Journal of Springer Verlag, 2005, 596 Pages.

Krieg, Mark L., "A Tutorial on Bayesian Belief Networks", In Technical Report, Dec. 2001, 66 Pages.

Lattanzi, S, et al., "Affiliation Networks", In Proceedings of the forty-first annual ACM symposium on Theory of computing. May 31, 2009, pp. 427-434.

Leskovec, J, et al., "Realistic, mathematically tractable graph generation and evolution, using kronecker multiplication", In Proceedings of the 9th European Conference on European Conference on Machine Learning and Principles and Practice of Knowledge Discovery in Databases, Oct. 3, 2005, pp. 133-145.

Lo, E, et al., "Generating databases for query workloads", In Proceedings of the VLDB Endowment, vol. 3, Issue 1-2, Sep. 2010, pp. 848-859.

Machanavajjhala, A, et al., "I-diversity: Privacy beyond k-anonymity", In Proceedings of 22nd International Conference on Data Engineering, Apr. 3, 2006, 12 Pages.

Mannila, H, et al., "Automatic generation of test data for relational queries", In Journal of Computer and System Sciences, 1989, pp. 240-258.

Marie, et al., "Managing Uncertainty in Schema Matcher Ensembles", In Proceedings of the 1st international conference on Scalable Uncertainty Management, Oct. 10, 2007, pp. 60-73.

Olston, et al., "Generating Example Data for Dataflow Programs", In Proceedings of the 2009 ACM SIGMOD International Conference on Management of data, Jun. 29, 2009, 12 Pages.

Pearl, J, "Probabilistic Reasoning in Intelligent Systems: Networks of Plausible Inference", In Book of Probabilistic reasoning in intelligent systems: networks of plausible inference, 1988. https://books.google.co.in/books?nl=en&lr=&id=mn2jBQAAQBAJ&oi=fnd&pg=PP1&dq=Probabilistic+Reasoning+in+Intelligent+Systems:+Networks+of+Plausible+Inference&ots=4rEV8F6G57&sig=nay4Zh673uyVEbRY1nnXYyWsMoA#v=onepage&q=Probabilistic%20Reasoning%20in%20Intelligent%20Systems%3A%20Networks%20of%20Plausible%20Inference&f=false.

Re, C, et al., "Understanding cardinality estimation using entropy maximization", In Proceedings of the twenty-ninth ACM SIGMOD-SIGACT-SIGART symposium on Principles of database systems, Jun. 6, 2010, pp. 53-64.

Revesz, Peter, "Quantifier-Elimination for the First-Order Theory of Boolean Algebras with Linear Cardinality Constraints", In Proceedings of East European Conference on Advances in Databases and Information Systems, Sep. 22, 2004, pp. 1-21.

Srivastava, U, et al., "ISOMER: consistent histogram construction using query feedback", In Proceedings of 22nd International Conference on Data Engineering, Apr. 3, 2006, 13 Pages.

Sweeney, Latanya, "K-Anonymity: A Model for Protecting Privacy", In International Journal on Uncertainty, Fuzziness and Knowledge-based Systems, vol. 10, Issue 5, Oct. 2002, pp. 1-14.

Syrjanen, T, "Logic Programs and Cardinality Constraints: Theory and Practice", Dissertation Submitted In Partial Fulfilment of the Degree of Doctor of Philosophy to the Helsinki University of Technology, 2009, 268 Pages.

Tarjan, R E., et al., "Simple linear-time algorithms to test chordality of graphs, test acyclicity of hypergraphs, and selectively reduce acyclic hypergraphs", In SIAM Journal on Computing, vol. 13 Issue 3, Aug. 1984, pp. 566-579.

Winick, J, et al., "Inet-3.0: Internet topology generator", In Technical Report CSE-TR-456-02, 2002, 19 Pages.

Winkler, W E., "Masking and re-identi?cation methods for public-use microdata: Overview and research problems", In Proceedings of International Workshop on Privacy in Statistical Databases, 2004, pp. 231-246.

"International Search Report and Written Opinion Issued in PCT Application No. PCT/US2019/058687", dated Jan. 16, 2020, 11 Pages.

* cited by examiner

STATIC DATA MASKING

BACKGROUND

Static data masking is a privacy feature that enables users to anonymize their database. The anonymization happens at the column level. Data is erased and replaced with fake data. Static data masking is a one-way operation. Once a database has been masked, it is no longer possible to restore the database to its state before masking. Users are responsible for choosing which columns they wish to anonymize as well as the configurations for these columns.

SUMMARY

Implementations described herein disclose a system for static data masking. The static data masking system may perform one or more operations including unbinding tables in a database, evaluating masking operations on the tables to determine that at least one masking operation on a particular column of a candidate table is a complex masking operation that cannot be completed using a query, adding a temporary key column with unique values to the candidate table, generating a temporary table including the temporary key column and an empty masked column, generating masked values for the particular column at a client, and populating the masked values for the particular column in the empty masked column of the temporary table.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

DETAILED DESCRIPTIONS

At the core of static data masking lies the concept of a masking function. A masking function is an algorithm that is used to generate data. It can be modeled as a function, e.g. a mathematical operation or series of mathematical operations that take a column (a set of N columns) as an input and returns a column (a set of N columns) as an output. Masking functions are responsible for implementing the three ideas mentioned earlier. Poorly combined, they can deprive the database of its structure or leave loopholes that can be exploited for the identification of masked records.

A static data masking system disclosed herein allows users to use one or more of such masking functions to mask data in one or more columns in a database while still preserving the relations between the various fields as well as keeping the constraints of the database. Specifically, an implementation of the static data masking system allows masking the data in the selected columns such that the statistical nature of the data in the database is still preserved.

Figure 1:
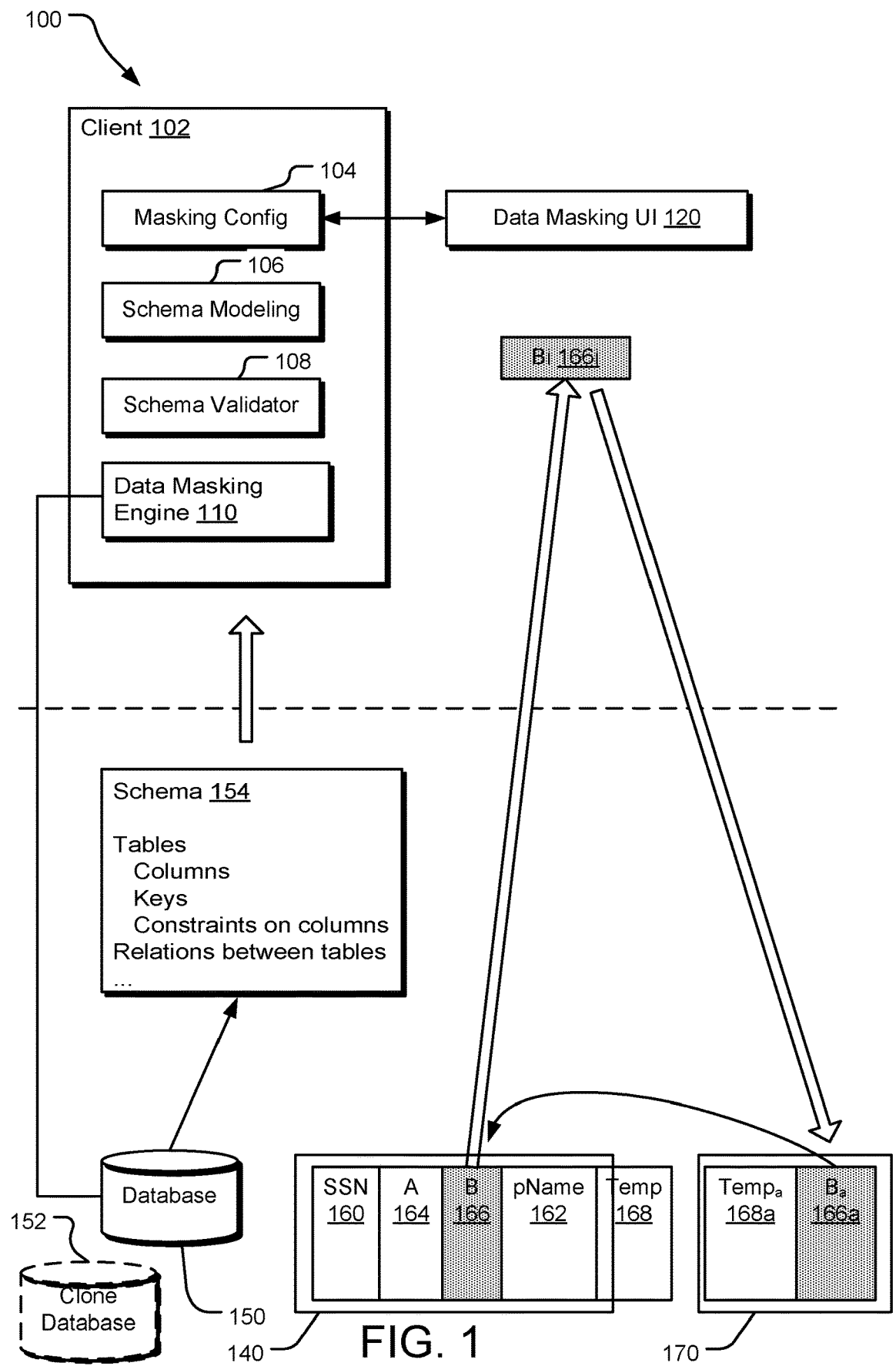
FIG. 1 illustrates an example implementation of a static data masking system disclosed herein.

FIG. 1 illustrates an implementation of a static data masking system 100 that allows users to request masking data in one or more fields of a database 150. For example, the database 150 may be a patient database with tables storing information about the patients' names and other personally identifiable information (PII) and various non-PII. The database 150 may be stored on a cloud server, an on-premise server, a network-based server that is accessible over the Internet, etc.

The technology disclosed herein provides technical advantages to computers and computing technology. Specifically, the static data masking system 100 improves efficiency and functioning of database systems by allowing complex masking configurations to be applied to columns of data in an efficient manner. For example, determining that some of the masking configurations are implemented on server side and other masking configurations are implemented on the client side reduces the network traffic, thus making efficient use of computing networks, thus improving the technical operations of the database and the networks connecting such databases.

A client 102 may be configured to allow a user to use a data masking user interface (UI) 120 to request various masking operations. For example, a user may request masking one or more of the PII from the database 150. Alternatively, a user may also use a command line instruction to request a masking operation. In one implementation, the client 102 may have access to the configuration and the shape of the data in the database 150. The client 102 may include a masking configuration generator 104 that communicates with the data masking UI 120 to allow a user to generate masking configuration for various columns of the database 150. A schema modeling module 106 may model and store the schema of the database 150, whereas a schema validator 108 analyzes the masking configuration to ensure that any of the constraints as per the schema are not invalid.

The client 102 communicates the request for the masking operation to a data masking engine 110. The data-masking engine 110 may be implemented on the server side where it can access the database 150 and work with the client 102 to affect the masking operations requested by the client 102.

Upon receiving the request for the masking operation, the data-masking engine 110 creates a clone database 152 of the database 150 and stores the clone database 152. This allows the client to preserve continuity of its operations that are accessing the data from the database 152. If the database 150 is an on-premise database, a combination of backup and restore commands may be sued to generate the clone database 152. If the database 150 is cloud based, a new database as a copy of the database 150 may be created. Once the clone database 152 is created, one or more of the masking operations by the data masking engine 110 may be performed on the clone database 152. As a result, the client is able to continue using the database 150 in normal course of business.

Subsequently, the data masking engine 110 copies schema 154 of the database 150 and communicates it to the client 102, where it may be stored. The schema 154 may include file system information about tables of the database 150, columns of the table, relations between tables, constraints on various columns of the tables, etc. The schema 154 may be used to validate one or more masking operation requests from the client 102. For example, if the schema identifies a column with a name SSN (SSN column 160) as a primary key, which typically includes data that is unique for each record or row, if a masking operation requests the SSN column 160 to be filled with same value, such request will result in data in SSN column 160 that does not meet the constraint of the values being unique. In such as case, a schema validator 108 may reject that particular masking operation request.

Once the schema 154 is saved, the data masking engine 110 drops all the constraints on the clone database 152. For example, the data masking engine 110 deletes the constraints of the clone database 152. Thus, if the SSN column 160 was constrained to have values that are unique, after dropping the constraint, the values in the SSN column 160 may be non-unique. This allows manipulating data at one or more intermediate states to affect the masking operation on the clone database 152.

Subsequently, the data masking engine 110 reviews the database table by table based on the masking operations requested by the client 102. For example, the client 102 may have requested to set all values of the SSN column 160 to a NULL value. An alternate masking operation request from the client 102 may be to change the values of the SSN column 160 data to a random number. Alternatively, the client 102 may have requested to shuffle all values of a pName column 162 that has names of the patients stored therein.

The data masking engine 110 determines the type of masking operations requested by the client 102 for various columns. Specifically, the data masking engine 110 determines which of the masking operations can be performed on the server side with a simple query and which of the masking operations are more complex and therefore requires additional processing of the data on the client side.

For example, the data masking engine 110 may determine that the masking operation required on column A 164 merely requires each value of column A 164 to be changed to NULL. In this case, the data masking engine 110 may issue a command to make such change in all values of column A 164. In one implementation, the command to make such a change may be a structured query language (SQL) command which may be used to query, insert, update, or modify data in tables of a relational database.

In one implementation, determining which masking operations can be implemented simply using an SQL command compared to the complex masking operations that require processing on the client side is determined based on the type of the masking operations. For example, in one implementation, each of various types of masking operations available to the client 102 may be categorized as being a simple masking operation or a complex masking operation.

On the other hand, the data masking engine 110 may determine that the masking operation on a column B 166 is a complex operation that requires additional processing on the client side. For example, the masking operation for column B 166 may be a random masking operation, which requires that pre-masking values of column B 166 are replaced with randomly generated values.

For a column with a complex masking operation, the data masking engine 110 generates a temporary column 168. The temporary column is populated with unique values. For example, in one implementation, the unique values in the temporary column may be globally unique identifier (GUID) values that may have a 16-byte value.

Subsequently, based on the instruction from the client 102, the data masking engine 110 determines if the original value of the column B 166 is desired or not. If so, the values of the column B 166 is pulled to the client side. Once the data from the column B 166 is communicated to the client side, the desired masking operation is performed on each value of the column B 166. In one implementation, as each value $Bi$ $166_i$ of the column B 166 is received at the client side, its value is changed as per the masking operation. The changed value is communicated back to the server side and stored in a masked version of column B 166, represented by a masked column $B_a$ $166_a$.

A copy of the temporary column 168, represented by column $temp_a$ $168_a$, is used to associate the values of the masked column $B_a$ $166_a$ in a temporary table 170. Subsequently an SQL command may be issued to insert the masked values from the masked column $B_a$ $166_a$ into the column B 166. Once the column B 166 is updated, table 170, including the temporary column 168 and $168_a$, is deleted. Subsequently, all the constraints on the table 140 are added back using the schema 154.

Figure 2:
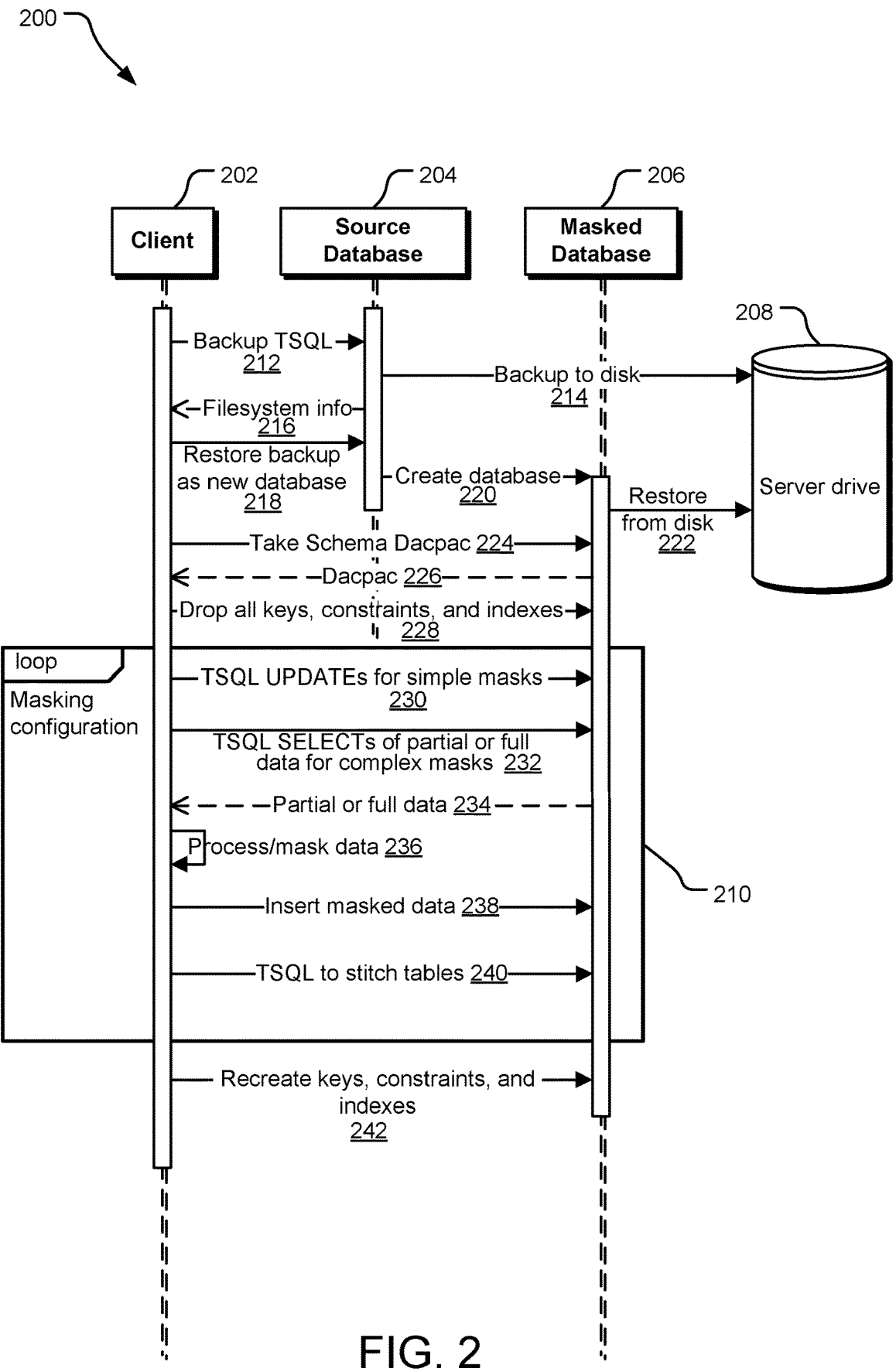
FIG. 2 illustrates example data flow diagram for the static data masking system disclosed herein.

FIG. 2 illustrates example data flow diagram 200 for the static data masking system disclosed herein. Specifically, the data flow diagram 200 illustrates the flow of information between a client 202, a source database 204, and a masked database 206. The client 202 may be a computing device, such as the computing device disclosed in FIG. 5 below that may be used for hosting an application programming interface (API) to a data masking system. In one implementation, a user may access the data masking API via a GUI that allows the user to select various masking operations to be performed on one or more columns of the source database 204. Thus, the API exposes the listing of the columns and one or more constraints on its masking to the user via such a GUI.

In one implementation, at 212 the client 202 may issue a transact-SQL (TSQL) command to back up the database 204. In response at 214, the source database 204 is backed up to a server drive 208. Subsequently, an operation 216 retrieves the file system information of the source database at the client. An operation 218 sends a restore command to restore the backed up database as a new database. Together the backup command 212 and the restore command 218 are used to generate a clone of the source database 204. In response to the restore command 218, at 220 the masked database 220 is created and the backed up data from the server 222 is restored to the masked database 220 at an operation 222.

An operation 224 sends a command to the masked database to get the schema of the masked database. In one implementation, the command may be a data-tier application (DAC) command and in return the schema is sent as a DAC pack (dacpac) at an operation 226 to the client 202. Once the schema is received, at operation 228 the client may issue a command to the masked database 206 to drop all keys, constraints and indexes.

Subsequently, a set of masking operations 210 are performed on the masked database 206 without all keys, constraints and indexes. For all masking operations that may be performed by a simple SQL command, an operation 230 sends a TSQL update command to the masked database 206. For example, if all values in a column in the masked database 206 is merely to be replaced by a NULL value, the operation 230 may initiate a TSQL update command to complete such an SQL capable masking operation.

For columns where complex masking operations are required, such as masking operations that may not be completed by an SQL command, an operation 232 sends a TSQL select command to retrieve data from that column. In one implementation, the data from the given column may be full, however, a set of columns chosen to have data retrieved therefrom may vary from none to all. In response, an operation 234 communicates such data to the client 202. At an operation 236 the retrieved data is processed to compete the complex masking operation at the client 202. Once the values for the column are updated with the complex masking operation, at an operation 238, the masked data for the given column are inserted to a temporary table with unique identification values, such as GUIDs, that are also added to a table of the masked database 206. Subsequently, a TSQL command is executed at an operation 240 to stitch or combine the masked values from the temporary table to the original table of the masked database 206. Once all of the masking operations 210 are complete, an operation 242 recreates all the keys, constraints, and indexes of the masked database 206. For example, the operation 242 may use dacpac to recreate all the keys, constraints, and indexes of the masked database 206.

Figure 3:
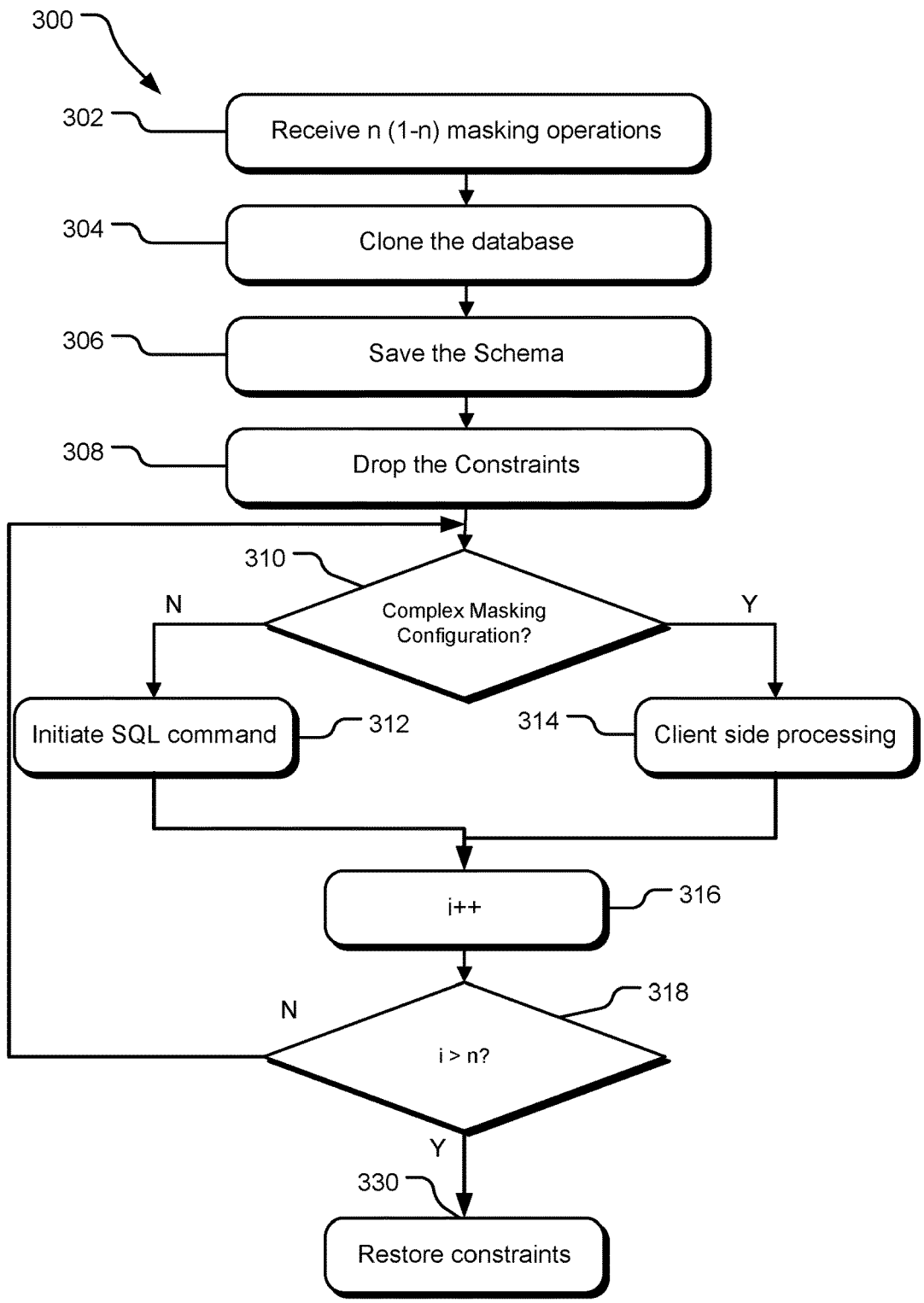
FIG. 3 illustrates example operations of the static data masking system disclosed herein.

FIG. 3 illustrates operations 300 of the static data masking system disclosed herein. An operation 302 receives n masking operations for a database from a user. For example, the user may use a GUI to specify the n masking operations. In one implementation, an application used by the user may validate the masking operations to ensure that they do not violate any constraints of the database to be masked. An operation 304 clones the database to generate a masked database. For example, the cloning operation may be executed using a combination of backup/restore commands. An operation 306 saves the schema of the masked database. Once the masked database schema is saved, an operation 308 drops the constraints on the masked database.

Now the masked database is ready for performing various masking operations. An operation 310 evaluates a masking configuration to determine if it is an SQL capable masking operation that may be completed using an SQL command or not. If it determines that the masking operation can be completed using as SQL command, an operation 312 initiates an SQL command to complete such masking. Example of such SQL capable masking operation include a single value masking, a scramble masking, NULL masking, etc. On the other hand, examples of masking operations that are complex and therefore cannot be completed by an SQL command include a bag masking operation, an encryption masking operation, a random masking operation, a histogram masking operation, etc.

On the other hand, if the operation 310 determines that the masking operation on a column is complex in that it cannot be completed by an SQL command, an operation 314 fetches the data from the column to the client side for further processing. Such client side processing operation 314 is disclosed in further detail in FIG. 4 below. Operations 312 and 322 increase the index value and operations 316 and 318 determine if there are any additional of the n masking operations to be completed. Once all masking operations are completed, an operation 330 restores the keys, constraints, and indexes of the masked database.

Figure 4:
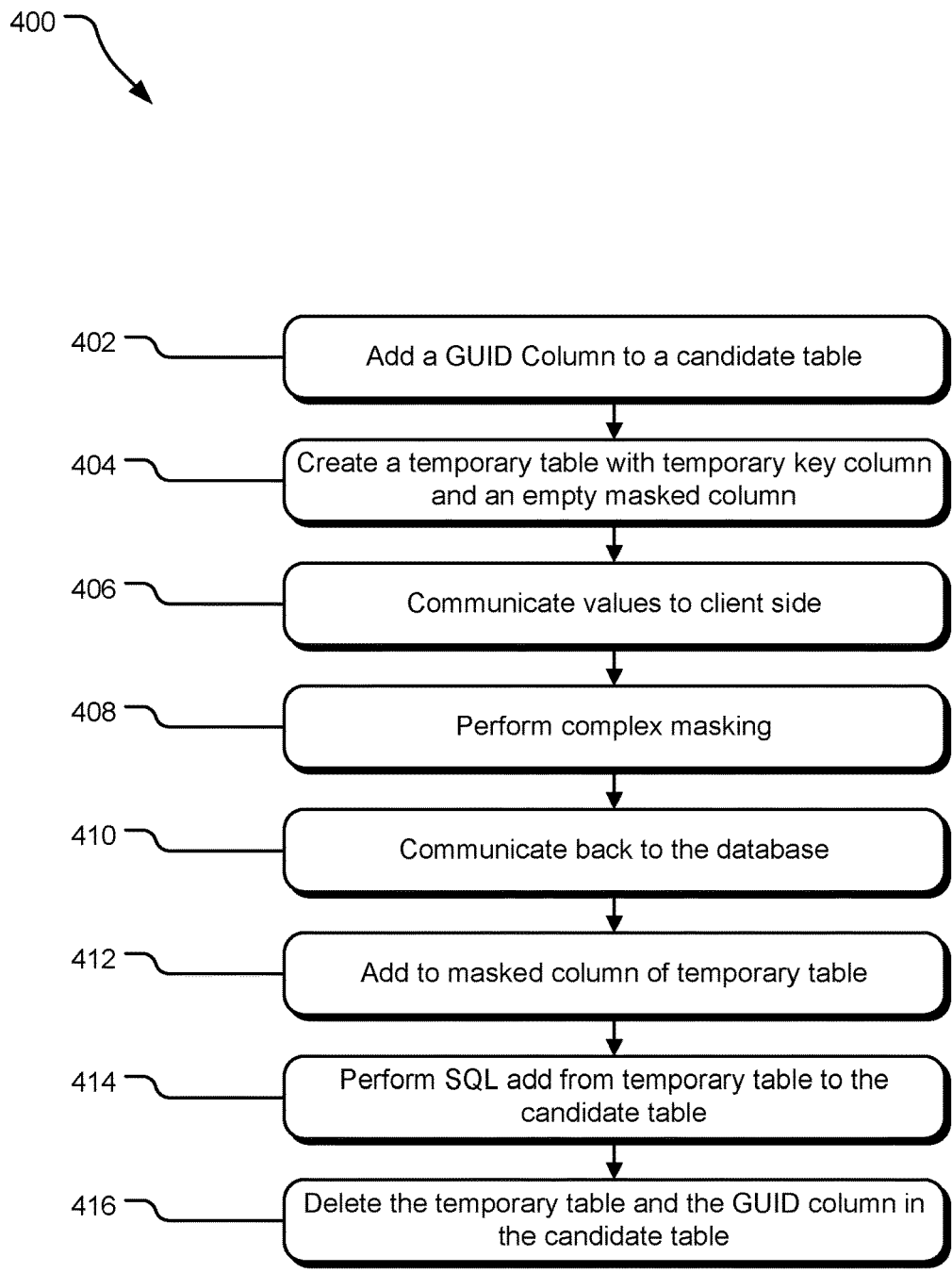
FIG. 4 illustrates additional example operations of the static data masking system disclosed herein.

FIG. 4 illustrates operations 400 of the static data masking system disclosed herein for complex masking on a column. An operation 402 adds a temporary key column to the table that includes the column requiring complex masking. The temporary key column may include unique key values such as GUID values and referred to as a GUID column. For example, for a candidate table with columns for SSN, pName, and pAddress, if the column SSN is to be masked using complex masking, the new GUID column with unique key values is added such that the candidate table now has four columns, namely SSN, pName, pAddress, and GUID. The GUID column includes values that are unique for each row.

An operation 404 creates a temporary table with a copy of the temporary key column and an empty column to store the masked values. The temporary keys may be GUIDs. Thus, the temporary table has two columns, namely the temporary key and maskedSSN. An operation 406 communicates the values of the column to be masked, in this example, column SSN, to the client. An operation 408 performs the complex masking operation on the values of the column SSN. The masked values are the column SSN are communicated back to the masked database at operation 410. The masked values are added to the empty column, namely the maskedSSN column, of the temporary table at operation 412. Subsequently an operation 414 performs an SQL operation to add the masked values from the maskedSSN column of the temporary table to the SSN column of the candidate table using the GUID from each of the temporary table and the candidate table as the key. An operation 416 deletes the temporary table and the GUID column from the candidate table.

Figure 5:
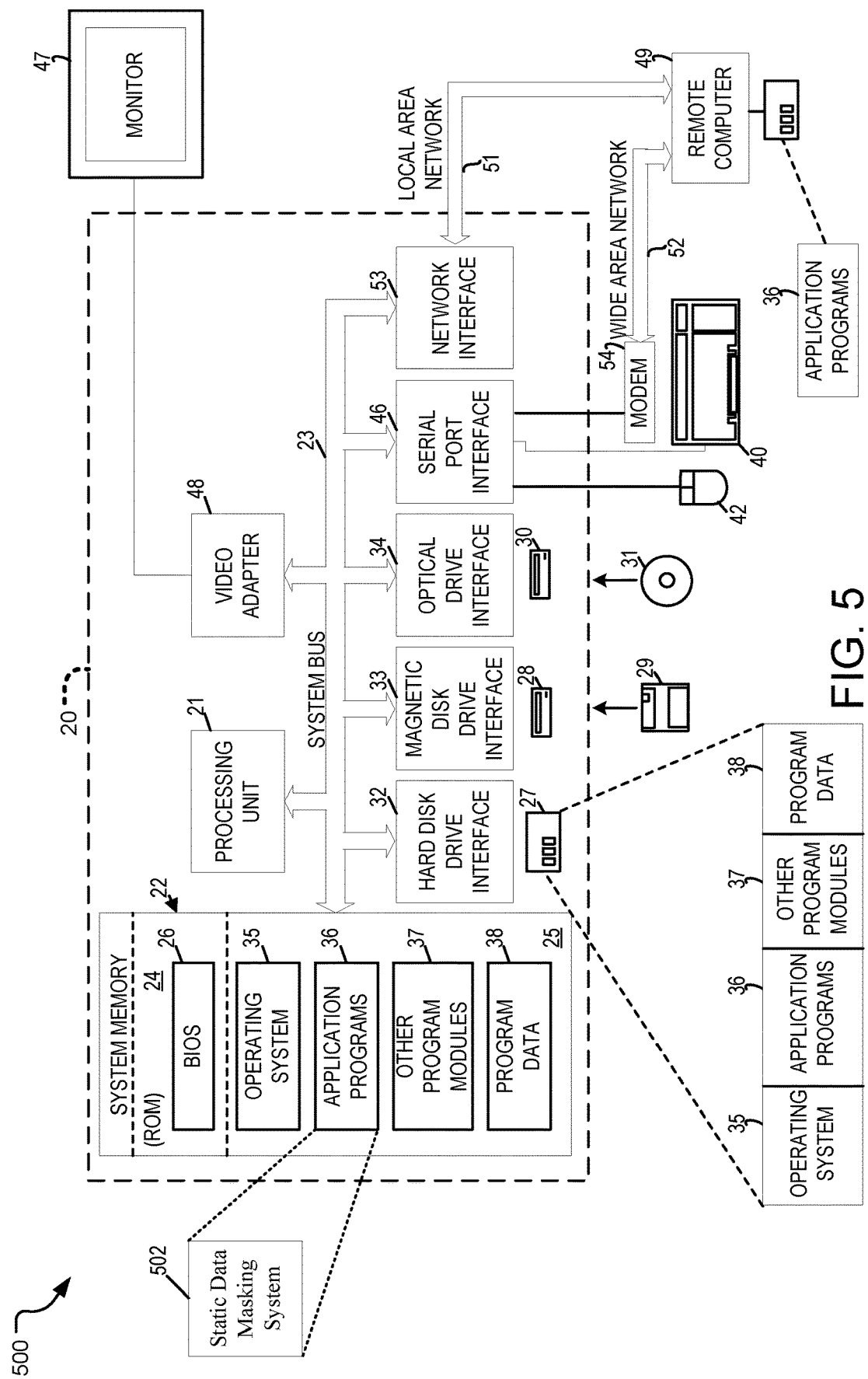
FIG. 5 illustrates an example computing system that may be useful in implementing the described technology.

FIG. 5 illustrates an example system 500 that may be useful in implementing the multi-modality video recognition system disclosed herein. The example hardware and operating environment of FIG. 5 for implementing the described technology includes a computing device, such as a general-purpose computing device in the form of a computer 20, a mobile telephone, a personal data assistant (PDA), a tablet, smart watch, gaming remote, or other type of computing device. In the implementation of FIG. 5, for example, the computer 20 includes a processing unit 21, a system memory 22, and a system bus 23 that operatively couples various system components including the system memory to the processing unit 21. There may be only one or there may be more than one processing unit 21, such that the processor of the computer 20 comprises a single central-processing unit (CPU), or a plurality of processing units, commonly referred to as a parallel processing environment. The computer 20 may be a conventional computer, a distributed computer, or any other type of computer; the implementations are not so limited.

The system bus 23 may be any of several types of bus structures including a memory bus or memory controller, a peripheral bus, a switched fabric, point-to-point connections, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM, DVD, or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated tangible computer-readable media provide non-volatile storage of computer-readable instructions, data structures, program modules and other data for the computer 20. It should be appreciated by those skilled in the art that any type of tangible computer-readable media may be used in the example operating environment.

A number of program modules may be stored on the hard disk drive 27, magnetic disk 28, optical disk 30, ROM 24, or RAM 25, including an operating system 35, one or more application programs 36, other program modules 37, and program data 38. A user may generate reminders on the personal computer 20 through input devices such as a keyboard 40 and pointing device 42. Other input devices (not shown) may include a microphone (e.g., for voice input), a camera (e.g., for a natural user interface (NUI)), a joystick, a game pad, a satellite dish, a scanner, or the like. These and other input devices are often connected to the processing unit 21 through a serial port interface 46 that is coupled to the system bus 23, but may be connected by other interfaces, such as a parallel port, game port, or a universal serial bus (USB) (not shown). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the implementations are not limited to a particular type of communications device. The remote computer 49 may be another computer, a server, a router, a network PC, a client, a peer device or other common network node, and typically includes many or all of the elements described above relative to the computer 20. The logical connections depicted in FIG. 10 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program engines depicted relative to the personal computer 20, or portions thereof, may be stored in the remote memory storage device. It is appreciated that the network connections shown are examples and other means of communications devices for establishing a communications link between the computers may be used.

In an example implementation, software or firmware instructions for providing attestable and destructible device identity may be stored in memory 22 and/or storage devices 29 or 31 and processed by the processing unit 21. One or more ML, NLP, or DLP models disclosed herein may be stored in memory 22 and/or storage devices 29 or 31 as persistent datastores. For example, a static data masking system 502 may be implemented on the computer 20 as an application program 36 (alternatively, the static data masking system 502 may be implemented on a server or in a cloud environment). The static data masking system 502 may utilize one of more of the processing unit 21, the memory 22, the system bus 23, and other components of the personal computer 20.

In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

An implementation disclosed herein provides a system for static data masking. The static data masking system may perform one or more operations including unbinding tables in a database, evaluating masking operations on the tables to determine that at least one masking operation on a particular column of a candidate table is a complex masking operation that cannot be completed using a query, adding a temporary key column with unique values to the candidate table, generating a temporary table including the temporary key column and an empty masked column, generating masked values for the particular column at a client, and populating the masked values for the particular column in the empty masked column of the temporary table. In an alternative implementation, the computer process further includes performing a query operation to restore masked values from the temporary table to the particular column of the candidate table.

Yet alternatively, the computer process further includes deleting the temporary table and the temporary key column from the candidate table. Alternatively, the computer process further includes restoring keys, constraints, and indexes of the database. Yet alternatively, the computer process includes determining that a masking operation on another column of the candidate table is a simple masking operation that can be completed using a query, the another column being different than the particular column and in response to the determination, performing a query operation to complete the simple masking operation.

In one implementation, the computer process further includes cloning the database using before unbinding the tables in the database. Alternatively, the computer process further includes saving schema of the database before unbinding the tables in the database. In one implementation, the complex masking operation is at least one of a bag masking operation, an encryption masking operation, a random masking operation, a histogram masking operation.

A method of providing a static data masking includes evaluating masking operations on tables of a database to determine that at least one masking operation on a particular column of a candidate table is a complex masking operation that cannot be completed using a query, adding a temporary key column with unique values to the candidate table, generating a temporary table including the temporary key column and an empty masked column, generating masked values for the particular column at a client, and populating the masked values for the particular column in the empty masked column of the temporary table. Alternatively, the method further includes unbinding the tables before evaluating the masking operations.

An alternative implementation further includes performing a query operation to restore masked values from the temporary table to the particular column of the candidate table. Yet alternatively, the method further includes restoring keys, constraints, and indexes of the database. Alternatively, the method further includes determining that a masking operation on another column of the candidate table is a simple masking operation that can be completed using a query, the another column being different than the particular column and in response to the determination, performing a query operation to complete the simple masking operation.

In another implementation, the method further includes cloning the database before unbinding the tables in the database using a backup operation and a restore operation. Yet alternatively, the complex masking operation is at least one of a bag masking operation, an encryption masking operation, a random masking operation, a histogram masking operation.

A system disclosed herein operates in a computing environment and includes a memory, one or more processor units, and a data masking system stored in the memory and executable by the one or more processor units, the static data masking system encoding computer-executable instructions on the memory for executing on the one or more processor units a computer process, the computer process including unbinding tables in a database, evaluating masking operations on the tables to determine that at least one masking operation on a particular column of a candidate table is a complex masking operation that cannot be completed using a query, adding a temporary key column with unique values to the candidate table, generating a temporary table including the temporary key column and an empty masked column, generating masked values for the particular column at a client, and populating the masked values for the particular column in the empty masked column of the temporary table.

In an alternative implementation, the computer process further includes performing a query operation to restore masked values from the temporary table to the particular column of the candidate table. Alternatively, the computer process further comprising deleting the temporary table and the temporary key column from the candidate table. Yet alternatively, the computer process further comprising restoring keys, constraints, and indexes of the database. In one implementation, the complex masking operation is at least one of a bag masking operation, an encryption masking operation, a random masking operation, a histogram masking operation.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language.

The above specification, examples, and data provide a complete description of the structure and use of exemplary embodiments of the invention. Since many implementations of the invention can be made without departing from the spirit and scope of the invention, the invention resides in the claims hereinafter appended. Furthermore, structural features of the different embodiments may be combined in yet another implementation without departing from the recited claims.

What is claimed is:

1. A physical article of manufacture including one or more tangible non-transitory computer-readable storage media, encoding computer-executable instructions for executing a computer process on a computer system, the computer process comprising:
   evaluating masking operations on tables in a database to determine that at least one masking operation on a particular column of a candidate table is a complex masking type operation, wherein the complex masking type operation is at least one of a bag masking operation, an encryption masking operation, a random masking operation, a histogram masking operation, and includes an operation that cannot be completed using a single query from a client computing device to a masked database stored on one or more server systems; and
   responsive to determining that the at least one masking operation is of the complex masking type operation, executing the at least one masking operation by
      adding a temporary key column with unique values to the candidate table of the masked database;
      generating a temporary table including the temporary key column and an empty masked column of the masked database;
      receiving, at the client computing device, one or more data values from the particular column of the candidate table of the masked database;
      generating masked values for the particular column at the client computing device based on the one or more received data values;
      populating the masked values for the particular column in the empty masked column of the temporary table of the masked database; and
      transmitting a command from the client computing device to the masked database to combine the masked values for the particular column of the temporary table of the masked database to an original table of the masked database.

2. The physical article of manufacture of claim 1, wherein the transmitting operation comprises: performing a query operation to restore masked values from the temporary table to the particular column of the candidate table.

3. The physical article of manufacture of claim 2, wherein the computer process further comprising deleting the temporary table and the temporary key column from the candidate table.

4. The physical article of manufacture of claim 3. wherein the computer process further comprising restoring keys, constraints, and indexes of the database.

5. The physical article of manufacture of claim 1, wherein the computer process further comprising:
   determining that a masking operation on another column of the candidate table is a simple masking operation that can be completed using a query, the another column being different than the particular column; and
   in response to the determination, performing a query operation to complete the simple masking operation.

6. The physical article of manufacture of claim 1, wherein the computer process further comprising cloning the database before unbinding the tables in the database.

7. The physical article of manufacture of claim 1, wherein the computer process further comprising saving schema of the database before unbinding the tables in the database.

8. The physical article of manufacture of claim 1, wherein the operation of generating masked values for the particular column at a client computing device comprises: communicating data from the particular column to the client computing device; and receiving the generated mask values for the particular column from the client computing device.

9. A method of providing a static data masking, the method comprising:
- evaluating masking operations on tables of a database to determine that at least one masking operation on a particular column of a candidate table is a complex masking type operation, wherein the complex masking type operation includes at least operation, a histogram masking operation, and further includes an operation that cannot be completed using a single query from a client computing device to a masked database stored on one or more server systems; and
- responsive to determining that the at least one masking operation is of the complex masking type operation, executing the at least one masking operation by
  - adding a temporary key column with unique values to the candidate table of the masked database;
  - generating a temporary table including the temporary key column and an empty masked column of the masked database;
  - receiving, at the client computing device, one or more data values from the particular column of the candidate table of the masked database;
  - generating masked values for the particular column at the client computing device based on the one or more received data values;
  - populating the masked values for the particular column in the empty masked column of the temporary table of the masked database; and
  - transmitting a command from the client computing device to the masked database to combine the masked values for the particular column of the temporary table of the masked database to an original table of the masked database.

10. The method of claim 9, further comprising unbinding the tables before evaluating the masking operations.

11. The method of claim 10, wherein the transmitting operation comprises: performing a query operation to restore masked values from the temporary table to the particular column of the candidate table.

12. The method of claim 11, further comprising restoring keys, constraints, and indexes of the database.

13. The method of claim 9, further comprising:
- determining that a masking operation on another column of the candidate table is a simple masking operation that can be completed using a query, the another column being different than the particular column; and
- in response to the determination, performing a query operation to complete the simple masking operation.

14. The method of claim 9, further comprising cloning the database before unbinding the tables in the database using a backup operation and a restore operation.

15. In a computing environment, a system comprising:
- a memory;
- one or more processor units;
- a static data masking system stored in the memory and executable by the one or more processor units, the static data masking system encoding computer-executable instructions on the memory for executing on the one or more processor units a computer process, the computer process comprising:
- evaluating masking operations on tables in a database to determine that at least one masking operation on a particular column of a candidate table is a complex masking type operation, wherein the complex masking type operation includes at least one of a bag masking operation, an encryption masking operation, a random masking, operation, a histogram masking operation, includes an operation that cannot be completed using a single query from a client computing device to a masked database stored on one or more server systems; and
- responsive to determining that the at least one masking operation is of the complex masking type operation, executing the at least one masking operation by
  - adding a temporary key column with unique values to the candidate table of the masked database;
  - generating a temporary table including the temporary key column and an empty masked column of the masked database;
  - receiving, at the client computing device, one or more data values from the particular column of the candidate table of the masked database;
  - generating masked values for the particular column at the client computing device based on the one or more received data values;
  - populating the masked values for the particular column in the empty masked column of the temporary table of the masked database; and
  - transmitting a command from the client computing device to the masked database to combine the masked values for the particular column of the temporary table of the masked database to an original table of the masked database.

16. The system of claim 15, wherein the transmitting operation comprises: performing a query operation to restore masked values from the temporary table to the particular column of the candidate table.

17. The system of claim 16, wherein the computer process further comprising deleting the temporary table and the temporary key column from the candidate table.

18. The system of claim 17, wherein the computer process further comprising restoring keys, constraints, and indexes of the database.

* * * * *